United States Patent [19]

Resconi et al.

[11] Patent Number: 5,049,535

[45] Date of Patent: Sep. 17, 1991

[54] CATALYSTS FOR THE POLYMERIZATION OF OLEFINS

[75] Inventors: Luigi Resconi; Umberto Giannini, both of Milan; Enrico Albizzati, Novara, all of Italy

[73] Assignee: Himont Incorporated, Wilmington, Del.

[21] Appl. No.: 471,901

[22] Filed: Jan. 30, 1990

[30] Foreign Application Priority Data

Jan. 31, 1989 [IT] Italy .................................. 19252 A/89

[51] Int. Cl.$^5$ ............................................... C08F 4/642
[52] U.S. Cl. ................................... 502/117; 502/109; 502/120; 502/132
[58] Field of Search ................ 502/109, 117, 120, 132

[56] References Cited

U.S. PATENT DOCUMENTS

| | | | |
|---|---|---|---|
| 2,924,593 | 2/1960 | Breslow | 502/117 X |
| 4,542,199 | 9/1985 | Kaminsky et al. | 502/117 X |
| 4,701,432 | 10/1987 | Welborn | 502/132 X |

FOREIGN PATENT DOCUMENTS

| | | |
|---|---|---|
| 0129368 | 5/1984 | European Pat. Off. |
| 875078 | 8/1961 | United Kingdom ................ 502/103 |

OTHER PUBLICATIONS

Chien, James C. W., and Wang, Bor-Ping, "Metallocene-Methylaluminoxane Catgalysts for Olefin Polymerization. I. Trimethylaluminum as Coactivator", Journal of Polymer Science/Part A: Polymer Chemistry, vol. 26, 3089–3102, 1988.
JP 63-168408, Abstract.

*Primary Examiner*—Patrick P. Garvin

[57] ABSTRACT

Catalysts for the polymerization of olefins, obtained from special zirconocenic compounds and from alkyl-Al compounds.

16 Claims, No Drawings

CATALYSTS FOR THE POLYMERIZATION OF OLEFINS

DESCRIPTION

The present invention relates to catalysts for the polymerization of olefins, obtained from zirconocenic compounds and from alkyl-Al compounds.

It is known how to polymerize ethylene by using catalysts obtained from zirconocenes and from trialkyl aluminum. The zirconocenes used in the known art can be represented by to the general formula:

$$(C_5R_nH_{5-n})_2ZrX_2 \quad (A)$$

where R is an alkyl with 1 to 8 C-atoms, n may be 0 or 1 or 2 and X may be a halogen atom, an alkoxy group or the anion of an organic or inorganic acid.

Examples of such catalysts have been reported in U.S. Pat. No. 2,924,593.

The activity of the aforementioned catalysts is extremely low in the polymerization of ethylene and practically nil in the polymerization of the higher alpha olefins.

It has now been found unexpectedly that by using in place of the zirconocenes employed until now, compounds of the general formula:

$$(C_5R'_nH_{5-n})R''_p(C_5R'_mH_{5-m})ZrX_q \quad (A')$$

it is possible to obtain, in combination with trialkyl aluminum compounds or alkyl aluminum monohydrides, catalysts endowed with elevated activity in the (co)polymerization of ethylene and $CH_2=CHR$ alpha olefins where R is an alkyl radical with 1-8 carbon atoms.

In the formula A', $(C_5R'_nH_{5-n})$ and $(C_5R'_mH_{5-m})$ are cyclopentadienyl groups, which are the same or different from each other, in which R' is an alkyl, alkenyl, aryl, alkylaryl or arylalkyl group containing from 1 to 20 C-atoms or a $-CR_2SiR_3$ group or a $-SiR_3$ group where R is the same as R', or where two or four R' substituents of the same cyclopentadienyl group form a ring having from 4 to 6 carbon atoms; R'' is a bivalent radical selected from the group consisting of an optionally substituted alkylenic group containing from 1 to 8 carbon atoms, a

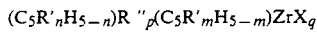

group, where R is the same as R', said bivalent radical R'' forming a connecting bridge between two cyclopentadienyl groups; X is hydrogen, halogen, —OH, —$OZr(C_5R'_nH_{5-n})(C_5R'_mH_{5-m})$, —OR, R having the same meaning as R', or a hydrocarbon radical having the meaning of R'. In the formula q is 1 or 2, and when q=1, Zr is trivalent and when q=2, Zr is tetravalent, and the X substituents are the same or different from each other; p is 0 or 1, and n, m are numbers from 0 to 5; (n+m) is $\geq 5$ when R' is a hydrocarbon radical and p=0: when p=1, (n+m) is $\geq 3$; when R' is a $-SiR_3$ or $-CR_2SiR_3$ group, R'' is an alkylenic group and p=0 or 1, (n+m) is $\geq 1$; when p=1 and R'' is

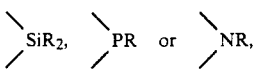

(n+m) is $\geq 0$.

Suitable examples of the A' zirconocenes are: $[C_5(CH_3)_3H_2]_2ZrCl_2$, $[C_5(CH_3)_4H]_2ZrCl_2$, $[C_5(CH_3)_5]_2ZrCl_2$, $[C_5(CH_3)_5]_2Zr(CH_3)_2$, $[C_5(CH_3)_5]_2ZrH_2$, $[C_5(CH_3)_5]_2Zr(OCH_3)_2$ $[C_5(CH_3)_5]_2Zr(OH)Cl$, $[C_5(CH_3)_5]_2Zr(OH)_2$, $[C_5(CH_3)_5]_2Zr(C_6H_5)_2$, $[C_5(CH_3)_5]_2Zr(CH_3)Cl$, $[C_5(C_2H_5)(CH_3)_4]_2ZrCl_2$, $[C_5(C_6H_5)(CH_3)_4]_2ZrCl_2$, $[C_5(C_2H_5)_5]_2ZrCl_2$, $[C_5(CH_3)_5]_2Zr(C_5H_5)Cl$, $[C_5(CH_3)_5]_2ZrCl$ bis(indenyl)ZrCl$_2$, bis(indenyl)Zr(CH$_3$)$_2$, ethylene bis(indenyl)ZrCl$_2$, ethylene bis(indenyl)Zr(CH$_3$)$_2$, $\{C_5[Si(CH_3)_3]H_4\}_2ZrCl_2$, $\{C_5[Si(CH_3)_3]_2H_3\}_2ZrCl_2$, $[C_5(CH_3)_5](C_5H_5)ZrCl_2$, $[C_5(CH_3)_5][C_5(CH_3)H_4]ZrCl_2$, $(CH_3)_2Si(C_5H_4)_2ZrCl_2$, $(CH_3)_2Si[C_5(CH_3)_4]_2ZrCl_2$, $(CH_3)_2C[C_5(CH_3)_4]_2ZrCl_2$, $(CH_3)_2C[C_5(CH_3)_4](indenyl)ZrCl_2$, $(CH_3)_2C(C_5H_4)(fluorenyl)ZrCl_2$.

Particularly suitable compounds are those in which the $(C_5R'_nH_{5-n})$ and $(C_5R'_mH_{5-m})$ groups are pentamethyl-cyclopentadienyl rings or indenyl groups and the X substituents are chlorine atoms, or alkyl groups, particularly those with 1 to 5 C-atoms, or —OH groups.

The trialkyl aluminum compounds or the alkyl aluminum monohydrides can be described by the formula $AlR_{3-z}H_z$ in which R is an alkyl, alkenyl or alkylaryl radical with 1-10 C-atoms and z=0 or 1.

Suitable examples of the alkyl aluminum compounds which may be used are: $Al(CH_3)_3$, $Al(C_2H_5)_3$, $AlH(C_2H_5)_2$, $Al(isoC_4H_9)_3$, $AlH(isoC_4H_9)_2$, $Al(C_6H_5)_3$, $Al(CH_2C_6H_5)_3$, $Al[CH_2C(CH_3)_3]_3$, $Al[CH_2Si(CH_3)_3]_3$, $Al(CH_3)_2(C_2H_5)$, $Al(CH_3)(C_2H_5)_2$, $Al(CH_3)_2(isoC_4H_9)$.

As indicated above, the catalysts according to the invention are suitable for the polymerization of ethylene and $CH_2=CHR$ alpha olefins or their mixtures.

The polymerization is carried out in the liquid phase in the presence of or without an inert hydrocarbon solvent or in the gaseous phase. The polymerization temperature generally ranges from 0° to 150° C., more particularly from 40° to 80° C.

The hydrocarbon solvents may be aromatic or aliphatic such as toluene, hexane, heptane, or chlorinated hydrocarbons such as $CH_2Cl_2$ or $C_2H_4Cl_2$.

The molecular weight of the polymers can be varied simply by varying the polymerization temperature, the type or concentration of the catalyst components or by using molecular weight regulators such as, for example, hydrogen.

The catalysts according to the invention may also be used on porous inert, inorganic or organic supports. This is done by depositing the zirconocene compound or the product of the reaction of the latter with the alkyl aluminum compound or the alkyl aluminum itself on inert supports such as, for example, silica, alumina, styrene-divinyl benzene copolymers or polyethylene.

The solid component thus obtained, optionally in combination with a further addition of the alkyl aluminum compound, is used advantageously particularly in the polymerization in the gaseous phase.

Particularly attractive results are obtained when the catalyst components are brought into contact with each other prior to the polymerization; the time of contact generally range from 1 minute to 1 hour and preferably from 5 to 10 minutes, at concentrations ranging for the zirconocenic compound from $10^{31\,3}$ to $10^{-8}$ mole/l and for the alkyl aluminum from 10 to $10^{-3}$ mole/l.

The following examples illustrate some of the embodiments of the invention.

EXAMPLE 1

A 1-liter autoclave equipped with a jacket for thermal control, a thermocouple, valves for feeding nitrogen and ethylene, a manometer and a magnetic stirrer made of steel, thermostated at 50° C., was put under a vacuum after prior evacuation and filling with nitrogen. Then, 1 atm of ethylene and 350 ml of toluene were introduced while maintaining an internal temperature of 50° C.

In 50 ml of toluene and under a nitrogen atmosphere were reacted 2 mmoles of trimethyl aluminum and 1 mg of $[C_5(CH_3)_5]_2ZrCl_2$. After 5 minutes at ambient temperature, the solution was injected into the autoclave which was then pressurized with ethylene at 4 atm and the polymerization was allowed to proceed for 1 hour at 50° C. while stirring at 1100 rpm and keeping the ethylene pressure constant. The results are shown in Table 1.

EXAMPLE 2-9

The procedure and ingredients of Example 1 were used, except that different alkyl aluminum compounds and different zirconocenes were employed. The compounds employed and the results obtained are shown in Table 1.

EXAMPLE 10

The procedure and ingredients of Example 1 were used except that propylene was polymerized. The polymerization temperature is maintained at 23° C. and the amount of dissolved propylene was such as to maintain a pressure of 4 atm.

18 mmoles of AlMe$_3$ and 4.4 mg of racemic ethylene bis(indenyl)ZrCl$_2$, dissolved in toluene, were injected into the autoclave in rapid succession. The polymerization was allowed to proceed at 23° C. for 17 hours, while stirring at 1100 rpm.

4.74 g of isotactic polypropylene was obtained:
$(\eta)_{inh}$ (THN, 135° C.)=0.37.
$\overline{M}w=29,149$.
$\overline{M}w/\overline{M}n=4.47$.
Tm=134.2° C.
Productivity: 4942 g polymer/g Zr.

TABLE 1

(Examples 1-9)
Conditions: 400 ml toluene, 4 atm, 50° C., 1 hour
Al = 5 mmole/l, components precontacted for
5 min at ambient temperature in the absence of ethylene

| Example No. | Zirconocene | mg Zr | Alkyl Al | gPE | gPE/gZr·h | $(\eta)_{inh}$ (dl/g) |
|---|---|---|---|---|---|---|
| 1 | Cp*$_2$ZrCl$_2$ | 0.211 | AlMe$_3$ | 32.8 | 155,400 | 2.6 |
| 2 | Cp*$_2$ZrCl$_2$ | 0.211 | AlEt$_3$ | 29.7 | 140,700 | 5.2 |
| 3 | Cp*$_2$ZrCl$_2$ | 0.0211 | AliBu$_3$ | 17.4 | 824,600 | 8.4 |
| 4 | Cp*$_2$ZrCl$_2$ | 0.0211 | AliBu$_2$H | 12.0 | 568,700 | — |
| 5 | Ind$_2$ZrCl$_2$ | 0.023 | AlMe$_3$ | 5.8 | 252,100 | 4.8 |
| 6 | Ind$_2$ZrCl$_2$ | 0.023 | AlEt$_3$ | 1.5 | 65,200 | 1.8 |
| 7 | Cp*$_2$ZrMe$_2$ | 0.023 | AlMe$_3$ | 9.8 | 426,000 | 3.2 |
| 8 | Cp*$_2$ZrMe$_2$ | 0.023 | AlEt$_3$ | 9.4 | 408,700 | 4.7 |
| 9 | Cp*$_2$Zr(OH)$_2$ | 0.0212 | AliBu$_3$ | 19.7 | 929,200 | 9.8 |

Note:
Me = —CH$_3$
Et = —CH$_2$CH$_3$
iBu = —CH$_2$CH(CH$_3$)$_2$
Cp = cyclopentadienyl
Cp* = pentamethyl cyclopentadienyl
Ind = indenyl
MeCp = methyl cyclopentadienyl

EXAMPLE 11

The same operating procedure is followed as in Example 10, except for the fact that 200 ml of CH$_2$Cl$_2$ is used as the solvent in place of toluene.

18 mmoles of AlMe$_3$ and 2 mg of racemic ethylene bis(indenyl)ZrCl$_2$, dissolved in 2 ml of toluene, are injected into the autoclave in rapid succession. The polymerization is allowed to proceed at 23° C. for 17 hours. Stirring rate: 1100 rpm.

2.74 g of isotactic polypropylene is obtained.
$\eta_{inh}$(THN, 135° C.)=0.33.
Productivity: 6284 g polymer/g Zr.

COMPARATIVE EXAMPLES 1-4

The same operating procedure is followed as in Example 1, except for the fact that the compounds of zirconium and alkyl aluminum shown in Table 2 are employed. Table 2 also lists the results obtained.

TABLE 2

(Comparative Examples 1-4)
Conditions and note are the same as in Table 1.

| Comp. Ex. No. | Zirconocene | mg Zr | Alkyl Al | gPE | gPE/gZr·h | $\eta_i$ (dl/g) |
|---|---|---|---|---|---|---|
| 1 | Cp$_2$ZrCl$_2$ | 0.212 | AlMe$_3$ | 8.2 | 38,700 | 2.6 |
| 2 | Cp$_2$ZrCl$_2$ | 0.212 | AlEt$_3$ | 0.45 | 2,100 | 1.4 |
| 3 | Cp$_2$ZrCl$_2$ | 0.312 | AliBu$_3$ | 2.15 | 6,900 | — |
| 4 | (MeCp)$_2$ZrCl$_2$ | 0.028 | AliBu$_3$ | 1.55 | 55,300 | — |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention and described and claimed.

We claim:

1. A catalyst for the polymerization of olefins comprising the product of the reaction between:

A') a zirconocenic compound of the formula

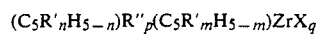

in which (C$_5$R'$_n$H$_{5-n}$) and (C$_5$R'$_m$H$_{5-m}$) are cyclopentadienyl groups, which are the same or different from each other, and in which R' is an alkyl, alkenyl, aryl, alkylaryl or arylalkyl radical containing from 1 to 20 C-atoms, a CR$_2$SiR$_3$ group or SiR$_3$ group where R is the same as R', or where two or four R' substituents of the same cyclopentadienyl group form rings having from 4 to 6 C-atoms; R" is a bivalent radical selected from the group consisting of an alkenyl group containing from 1 to 8 C-atoms, a 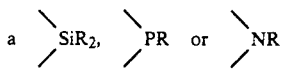

group where R is the same as R', said R" forming a connecting bridge between two cyclopentadienyl groups; X is hydrogen, halogen, —OH, —OZr(C$_5$R'$_n$H$_{5-n}$)(C$_5$R'$_m$H$_{5-m}$), —OR where R is the same as R', or a hydrocarbon radical having the meaning of R'; q is 1 or 2 and when q is 1, Zr is trivalent and when q is 2, Zr is tetravalent and the X substituents are the same or different from each other; p is 0 or 1 and n, m are integers from 0 to 5; in the case where R' is a hydrocarbon radical and p=0, (n+m) is ≧5; when p=1, (n+m) is ≧3; when R' is a —SiR$_3$ or —CR$_2$SiR$_3$ group (n+m) is ≧1 when p=0 or when p=1 and R" is an alkylenic group; when p=1 and R" is

(n+m) is ≧0;

B') a trialkyl-Al compound or an alkyl-Al monohydride of the formula:

in which R is an alkyl, alkenyl or alkylaryl radical with 1-10 C-atoms and z=0 or 1.

2. The catalyst according to claim 1, in which the (C$_5$R'$_n$H$_{5-n}$) and (C$_5$R'$_m$H$_{5-m}$) groups are pentamethylcyclopentadienyl rings or indenyl rings and the X substituents are chlorine atoms, —OH groups or alkyl radicals with 1-5 C-atoms.

3. The catalyst according to claim 1, in which the alkyl-Al compound is a trialkyl-Al compound or an alkyl-Al monohydride.

4. The catalyst according to claim 2, in which the alkyl-Al compound is a trialkyl-Al compound or an alkyl-Al monohydride.

5. The catalyst according to claim 1, in which the catalyst components A' and B' are brought into contact with each other in the absence of the monomer before being employed in the polymerization phase.

6. The catalyst according to claim 2, in which the catalyst components A' and B' are brought into contact with each other in the absence of the monomer before being employed in the polymerization phase.

7. The catalyst according to claim 3, in which the catalyst components A' and B' are brought into contact with each other in the absence of the monomer before being employed in the polymerization phase.

8. The catalyst according to claim 4, in which the catalyst components A' and B' are brought into contact with each other in the absence of the monomer before being employed in the polymerization phase.

9. The catalyst according to claim 1, in which the catalyst components A' and B' or their reaction product are supported on porous inert, inorganic or organic supports.

10. The catalyst according to claim 2, in which the catalyst components A' and B' or their reaction product are supported on porous inert, inorganic or organic supports.

11. The catalyst according to claim 3, in which the catalyst components A' and B' or their reaction product are supported on porous inert, inorganic or organic supports.

12. The catalyst according to claim 4, in which the catalyst components A' and B' or their reaction product are supported on porous inert, inorganic or organic supports.

13. The catalyst according to claim 5, in which the catalyst components A' and B' or their reaction product are supported on porous inert, inorganic or organic supports.

14. The catalyst according to claim 6, in which the catalyst components A' and B' or their reaction product are supported on porous inert, inorganic or organic supports.

15. The catalyst according to claim 7, in which the catalyst components A' and B' or their reaction product are supported on porous inert, inorganic or organic supports.

16. The catalyst according to claim 8, in which the catalyst components A' and B' or their reaction product are supported on porous inert, inorganic or organic supports.

* * * * *

UNITED STATES PATENT AND TRADEMARK OFFICE
CERTIFICATE OF CORRECTION

PATENT NO. : 5,049,535

DATED : September 17, 1991

INVENTOR(S) : Luigi Resconi et al.

It is certified that error appears in the above-identified patent and that said Letters Patent is hereby corrected as shown below:

At col. 2, line 36, change "$Al[CH_2Si(CH_3)_3$" to --$Al[CH_2Si(CH_3)_3]_3$--.

At col. 3, line 3, change "$C^{313}$" to --$10^{-3}$--

At col. 4, line 42, change "38.700" to --38,700--.

Signed and Sealed this

Twenty-sixth Day of January, 1993

*Attest:*

STEPHEN G. KUNIN

*Attesting Officer*     *Acting Commissioner of Patents and Trademarks*